No. 794,789.

Patented July 18, 1905.

UNITED STATES PATENT OFFICE.

JOSEPH LOUIS DANZIGER, OF NEW YORK, N. Y., ASSIGNOR TO CASTNER ELECTROLYTIC ALKALI COMPANY, A CORPORATION OF VIRGINIA.

PROCESS OF MAKING CARBON TETRACHLORID.

SPECIFICATION forming part of Letters Patent No. 794,789, dated July 18, 1905.

Application filed April 27, 1904. Serial No. 205,236.

*To all whom it may concern:*

Be it known that I, JOSEPH LOUIS DANZIGER, a citizen of the United States, and a resident of the borough of Manhattan, city, county, and State of New York, have invented new and useful Improvements in Processes for the Preparation of Carbon Tetrachlorid, of which the following is a specification.

This invention relates to a process of preparing carbon tetrachlorid from carbon bisulfid and chlorid of sulfur. Heretofore in the preparation of carbon tetrachlorid from these substances the reaction between them for the formation of carbon tetrachlorid has been brought about by the use of either iron chlorid or of metallic iron in the form of filings. When iron filings were used, the sulfur chlorid immediately reacted upon the iron and converted it into iron chlorid, which chlorid thereafter became the inducing cause of the reaction between the carbon bisulfid and the sulfur chlorid to form carbon tetrachlorid. Therefore, since the metal was first converted into chlorid before any reaction was induced to form carbon tetrachlorid, it follows that the real agency which brought about the reaction between the carbon bisulfid and the chlorid of sulfur in the process as heretofore practiced for the preparation of carbon tetrachlorid was a metallic chlorid and not a metal. In my process, however, the inducing cause of the reaction is a metal or metals—to-wit, amalgamated aluminium or its equivalent—said amalgamated aluminium remaining substantially unchanged throughout the process and unconverted into metallic chlorid. It follows, therefore, that my carbon-tetrachlorid process, calling for the use of amalgamated aluminium or its equivalent, is radically different from any process calling for the use of iron filings or of iron chlorid. Furthermore, my process has large advantages over the old carbon-tetrachlorid process. Some of these advantages are as follows: The use of the amalgamated aluminium gives a greatly-increased yield of carbon tetrachlorid. The reaction is far less violent, is more easily carried out, and takes less time. No metallic chlorid is formed, and consequently no gummy tarry mass is formed as a by-product of the reaction, and consequently in my process there is no difficulty arising from the necessity of handling and separating such gummy by-product. A much smaller amount of amalgamated aluminium will bring about the reaction in accordance with my process than if iron were used as per the old method, and the amalgamated aluminium, since it remains unattacked, can be used over and over again, provided suitable precautions are taken to keep it out of contact with the air.

I ordinarily prepare the amalgamated aluminium by treating metallic aluminium in the form of turnings or foil previously freed from oil or grease with a dilute solution of mercuric chlorid until the surface of the aluminium is covered with a film of mercury. The aluminium may then be washed, first in water, then in alcohol, and is preferably kept in ether until ready for use.

A further feature of my process consists in using a great excess of sulfur chlorid over and above the theoretical amount necessary to combine with carbon bisulfid to form carbon tetrachlorid. By the use of such excess I find that a much greater yield of the tetrachlorid is obtained than if smaller amounts of sulfur chlorid were used. The theoretical ratio of sulfur chlorid to carbon bisulfid is two molecules of sulfur chlorid to one molecule of carbon bisulfid, as will appear by the following formula, which may be taken as expressive of the carbon tetrachlorid reaction:

$$CS_2 + 2S_2Cl_2 = CCl_4 + 6S.$$

The proportion of sulfur chlorid which I find to give the best yield is substantially twice the theoretical quantity—in other words, substantially four molecules of sulfur chlorid to one molecule of carbon bisulfid.

As an example of the practical working of my process I mix five hundred and forty parts of sulfur chlorid and seventy-six parts of carbon bisulfid (this being in the ratio of four to one) and drop into the same a small portion of amalgamated aluminium. The whole is contained in a suitable vessel provided with a return-condenser. The mass is then warmed until the reaction begins, usually at a temperature approximating 70° centigrade, which thereupon goes forward quietly with the production of carbon tetrachlorid and sulfur. When the reaction is over, which is indicated by the solution becoming quiescent, the solution is allowed to cool, whereby most of the sulfur separates out and leaves the carbon tetrachlorid and the excess of sulfur chlorid as a supernatant liquid. The sulfur is then separated and the liquid subjected to fractional distillation in order to separate the carbon tetrachlorid from the sulfur chlorid. This is the way I prefer to carry out this part of the process; but, if desired, the distillation operation can be carried out in the presence of the sulfur without taking the trouble to first remove it. Any impurity of sulfur chlorid still present in the carbon tetrachlorid distillate may now be removed by washing said distillate with an alkali, the carbon tetrachlorid being then separated and redistilled, after which it is ready to be applied to its various commercial uses.

I prefer to use the sulfur monochlorid ($S_2Cl_2$) in my process; but the higher chlorids of sulfur are also available.

Without enumerating equivalents, what I desire to claim as my invention is—

1. The process substantially as herein described, for preparing carbon tetrachlorid, which consists in treating carbon bisulfid with sulfur chlorid in the presence of amalgamated aluminium.

2. The process substantially as herein described, for preparing carbon tetrachlorid, which consists in bringing about a reaction between carbon bisulfid and sulfur chlorid by the use of amalgamated aluminium in the presence of heat.

3. The process substantially as herein described, for preparing carbon tetrachlorid, consisting of reacting upon carbon bisulfid with substantially twice the theoretical quantity of sulfur chlorid.

4. The process substantially as herein described, for preparing carbon tetrachlorid, which consists in reacting upon carbon bisulfid with substantially twice the theoretical quantity of sulfur chlorid in the presence of amalgamated aluminium.

In testimony whereof I have signed this specification in the presence of two subscribing witnesses.

JOSEPH LOUIS DANZIGER.

Witnesses:
  EUGENE N. ROBINSON,
  E. W. SCHERR, Jr.